United States Patent [19]
Girgis

[11] Patent Number: 5,827,612
[45] Date of Patent: Oct. 27, 1998

[54] AQUEOUS COATING COMPOSITIONS FOR GLASS FIBERS, FIBER STRANDS COATED WITH SUCH COMPOSITIONS AND OPTICAL FIBER CABLE ASSEMBLIES INCLUDING SUCH FIBER STRANDS

[75] Inventor: Mikhail M. Girgis, Wexford, Pa.

[73] Assignee: PPG Industries, Inc., Pittsburgh, Pa.

[21] Appl. No.: 522,766

[22] Filed: Sep. 1, 1995

Related U.S. Application Data

[63] Continuation-in-part of Ser. No. 81,045, Jun. 22, 1993, abandoned, which is a continuation-in-part of Ser. No. 900,036, Jun. 17, 1992, Pat. No. 5,369,141.

[51] Int. Cl.$^6$ ...................................................... D02G 3/00
[52] U.S. Cl. .......................... 428/378; 428/375; 428/392; 428/394; 427/407.1; 427/407.3; 427/413
[58] Field of Search ..................................... 428/375, 378, 428/371, 392, 394, 376; 427/53.1, 54.1, 55, 407.1, 407.3, 416

[56] References Cited

U.S. PATENT DOCUMENTS

| | | | |
|---|---|---|---|
| 3,175,988 | 3/1965 | Berns | 260/29.6 |
| 3,599,418 | 8/1971 | Hill | 57/164 |
| 3,617,353 | 11/1971 | Cooney | 117/76 T |

(List continued on next page.)

FOREIGN PATENT DOCUMENTS

| | | |
|---|---|---|
| 76043119 | 11/1976 | Japan . |
| 80029948 | 8/1980 | Japan . |
| 62-236831 | 10/1987 | Japan . |
| 63-265839 | 11/1988 | Japan . |
| 92028663 | 5/1992 | Japan . |
| 595351 | 3/1978 | U.S.S.R. . |
| WO 94/15884 | 7/1921 | WIPO . |

OTHER PUBLICATIONS

Textile Chemicals Product Brochure entitled "Polymers, Resins and Monomers" for RHOPLEX® HA–8, HA–12, HA–16, from Rohm and Haas Company, Philadelphia, Pennsylvania.

The Manufacturing Technology of Continuous Glass Fibres by K. L. Loewenstein (1973) p. 29.

USSN. 07/934,133, filed Aug. 21, 1992 entitled "Polyurethane Coated Fibers".

"Rhoplex® HA–8, Rhoplex® HA–12, Rhoplex®HA–16", Technical Bulletin of Rohm and Haas Company, Jan., 1978.

USSN 07/979,506, Filed Nov. 20, 1992, entitled "Multifilament Reinforcing Article".

USSN 08/081,045, filed Jun. 22, 1993 entitled "Acrylic Impregnant for Fibers".

"Building Better Nonwovens", Product Bulletin of Rohm and Haas Co. Specialty Industrial Polymers, 1994.

(List continued on next page.)

Primary Examiner—Merrick Dixon
Attorney, Agent, or Firm—Ann Marie Cannoni

[57] ABSTRACT

The present invention provides a secondary aqueous coating composition for coating sized glass fibers of a glass fiber strand, including a first water soluble, emulsifiable or dispersible curable acrylic polymer and a second water soluble, emulsifiable or dispersible curable acrylic polymer different from the first acrylic polymer, the secondary aqueous coating composition being essentially free of a urethane-containing polymer. Other aspects of the present invention include a strand of sized glass fibers having thereon the aforementioned coating composition and an optical fiber cable assembly including an optical fiber and a reinforcement strand of the sized and secondarily coated glass fibers. In an alternative embodiment of the present invention, the sized glass fibers of the reinforcement strand of the optical fiber cable assembly have thereon the dried residue of a secondary aqueous coating composition which includes a water soluble, emulsifiable or dispersible curable acrylic polymer and a wax material, the secondary aqueous coating composition being essentially free of a urethane-containing polymer.

4 Claims, 1 Drawing Sheet

U.S. PATENT DOCUMENTS

| | | |
|---|---|---|
| 3,853,605 | 12/1974 | Fahey . |
| 3,862,074 | 1/1975 | Hickey ............................ 260/29.6 NR |
| 4,009,317 | 2/1977 | Chase et al. ............................ 428/378 |
| 4,029,623 | 6/1977 | Maaghul . |
| 4,038,243 | 7/1977 | Maaghul ............................ 260/40 R |
| 4,049,865 | 9/1977 | Maaghul . |
| 4,060,658 | 11/1977 | Lin et al. ............................ 428/378 |
| 4,066,591 | 1/1978 | Scriven et al. ................... 260/29.2 TN |
| 4,107,120 | 8/1978 | Plamondon et al. ............ 260/29.6 RB |
| 4,137,209 | 1/1979 | Wong et al. .................... 260/29.6 NR |
| 4,143,091 | 3/1979 | Chang et al. ....................... 260/859 R |
| 4,147,555 | 4/1979 | Cohen et al. ............................ 106/99 |
| 4,164,485 | 8/1979 | Girgis ............................ 260/5 |
| 4,181,769 | 1/1980 | Plamondon et al. .................... 428/253 |
| 4,188,421 | 2/1980 | Matsuura et al. .................... 427/385 A |
| 4,208,494 | 6/1980 | Chang et al. ............................ 525/440 |
| 4,208,495 | 6/1980 | Chang et al. ............................ 525/440 |
| 4,239,800 | 12/1980 | Girgis ............................ 428/374 |
| 4,263,362 | 4/1981 | Straka ............................ 428/258 |
| 4,291,095 | 9/1981 | Chase et al. ............................ 428/391 |
| 4,316,929 | 2/1982 | McIntire et al. ....................... 428/262 |
| 4,374,177 | 2/1983 | Hsu et al. ............................ 428/392 |
| 4,382,991 | 5/1983 | Pollman ............................ 428/391 |
| 4,390,647 | 6/1983 | Girgis ............................ 523/212 |
| 4,454,285 | 6/1984 | Bijen ............................ 524/5 |
| 4,473,616 | 9/1984 | Rademacher ............................ 428/251 |
| 4,576,987 | 3/1986 | Crockatt et al. ........................ 524/487 |
| 4,657,804 | 4/1987 | Mays et al. ............................ 428/212 |
| 4,663,231 | 5/1987 | Girgis et al. ............................ 428/378 |
| 4,728,573 | 3/1988 | Temple ............................ 428/378 |
| 4,762,750 | 8/1988 | Girgis et al. ............................ 428/378 |
| 4,762,751 | 8/1988 | Girgis et al. ............................ 428/378 |
| 4,795,678 | 1/1989 | Girgis ............................ 428/391 |
| 5,171,634 | 12/1992 | Soszka et al. ........................ 428/376 |
| 5,197,202 | 3/1993 | Jensen ............................ 34/23 |
| 5,319,003 | 6/1994 | Gomez et al. ........................ 523/222 |
| 5,385,756 | 1/1995 | Lofton ............................ 427/389.9 |

OTHER PUBLICATIONS

"Chemicals for the Textile Industry", Technical Bulletin of Rohm and Haas Co., Nov. 1977.

"Glass Reinforcements in Composite Telecommunication Cable", T. Hager, 50th Annual Conference, Composites Institute, The Society of Plastics Industry, Inc., Jan. 30–Feb. 1, 1995.

Hawley's Condensed Chemical Dictionary (12 Ed. 1993) at pp. 331, 435, 461, 1075.

U.S. Patent Application Ser. No. 07/900,034, filed Jun. 17, 1992 (copy enclosed for Examiner's convenience.

U.S. Patent Application Ser. No. 08/522,782, filed Sep. 1, 1995 (copy enclosed for Examiner's convenience.

AQUEOUS COATING COMPOSITIONS FOR GLASS FIBERS, FIBER STRANDS COATED WITH SUCH COMPOSITIONS AND OPTICAL FIBER CABLE ASSEMBLIES INCLUDING SUCH FIBER STRANDS

CROSS REFERENCE TO RELATED APPLICATIONS

This application is a continuation-in-part of U.S. patent application Ser. No. 08/081,045, filed Jun. 22, 1993 now abandoned, which is a continuation-in-part of U.S. patent application Ser. No. 07/900,036, filed Jun. 17, 1992, now U.S. Pat. No. 5,369,141. This application is related to copending U.S. Patent Application entitled "Optical Fiber Cable Assembly And Method Of Reducing Water Wicking In The Same" of Mikhail M. Girgis filed concurrently with the present application.

FIELD OF THE INVENTION

This invention is directed to a secondary aqueous coating and/or impregnating composition, strands of sized glass fibers which have been coated, encapsulated or otherwise treated with such a composition and optical fiber cable assemblies including such strands.

BACKGROUND OF THE INVENTION

Typically, the surfaces of glass fiber substrates are coated with a sizing composition during the forming process to protect the glass fibers from interfilament abrasion. Such sizing compositions can include as components film-formers, lubricants, coupling agents, emulsifiers, antioxidants, ultraviolet light stabilizers, colorants, antistatic agents and water, to name a few.

Conventional sizing compositions, however, do not impart to the glass fibers sufficient flexural strength, stiffness, tensile strength, acid resistance, outgassing and compressive strength when such glass fibers are used in applications where such properties are important, for example, reinforcement for optical fibers, brushes, belts, hoses, filter felt for the paper industry, carpet backing and braiding for electrical wiring insulation.

In woven and nonwoven fabrics, for example, attempts to solve the problem of providing a glass fiber with sufficient flexibility are described in U.S. Pat. Nos. 4,762,750 and 4,762,751. These patents teach a secondary coating having elastomeric curable polyurethanes, crosslinking agents, softeners and water. The fibers treated with these compositions do not possess the desired amount of stiffness for some of the applications described above, such as optical fiber cable reinforcement.

U.S. Pat. No. 5,182,784 discloses an aqueous coating composition for glass fibers consisting essentially of a thermoplastic polyurethane latex, an acrylic latex, and either a second acrylic latex or paraffin wax. This coating is disclosed as reducing water wicking by glass fibers in applications such as optical fiber cable reinforcement.

Accordingly, a need exists for less expensive coatings for glass fibers which are compatible with a range of polymers and can be used in a number of applications in which relative stiffness, flexural strength, tensile strength, acid and caustic resistance, abrasion resistance, outgassing and compressive strength are needed.

SUMMARY OF THE INVENTION

The present invention provides a secondary aqueous coating composition for coating at least a portion of a plurality of sized glass fibers of a glass fiber strand, comprising: (a) a first water soluble, emulsifiable or dispersible curable acrylic polymer; and (b) a second water soluble, emulsifiable or dispersible curable acrylic polymer different from the first acrylic polymer, the secondary aqueous coating composition being essentially free of a urethane-containing polymer.

Another aspect of the present invention is a strand comprising a plurality of sized glass fibers having on at least a portion thereof the aforementioned secondary aqueous coating composition.

The present invention also provides an optical fiber cable assembly comprising: (a) an optical fiber; and (b) a reinforcement strand positioned about at least a portion of a periphery of the optical fiber for reinforcing the optical fiber, the reinforcement strand comprising a plurality of sized glass fibers having on at least a portion thereof a dried residue of the aforementioned secondary aqueous coating composition.

In another aspect of the present invention, the optical fiber cable assembly comprises: (a) an optical fiber; and (b) a reinforcement strand positioned about at least a portion of a periphery of the optical fiber for reinforcing the optical fiber, the reinforcement strand comprising a plurality of sized glass fibers having on at least a portion thereof a dried residue of a secondary aqueous coating composition, the secondary aqueous coating composition consisting essentially of: (a) a water soluble, emulsifiable or dispersible curable acrylic polymer; and (b) a wax material, the secondary aqueous coating composition being essentially free of a urethane-containing polymer.

BRIEF DESCRIPTION OF THE DRAWINGS

The foregoing summary, as well as the following detailed description of the preferred embodiments, will be better understood when read in conjunction with the appended drawings. In the drawings.

DETAILED DESCRIPTION OF THE INVENTION

Figure 1:
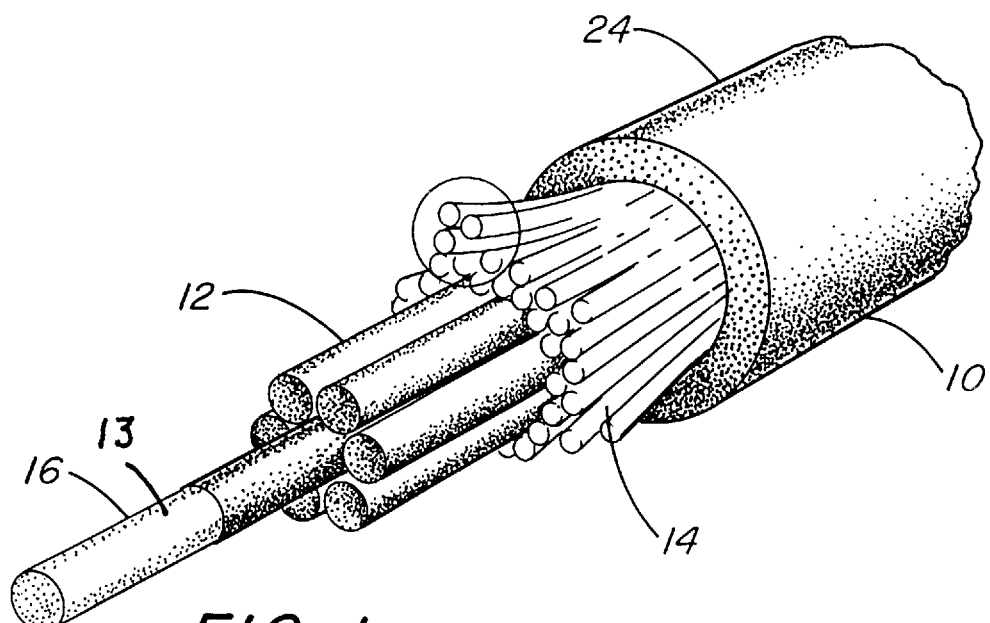
FIG. 1 is a perspective view of a portion of an optical fiber cable assembly according to the present invention.
Figure 2:
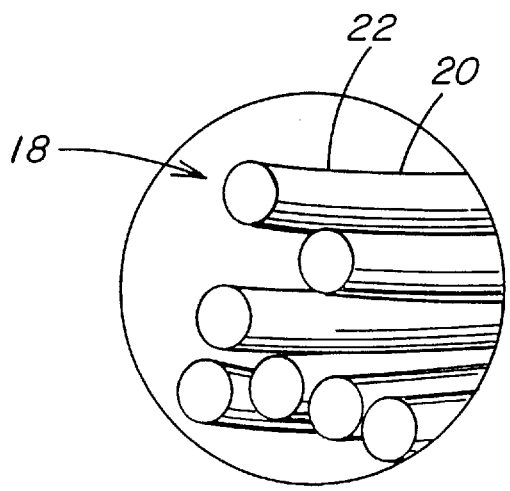
FIG. 2 is an enlarged view of a portion of FIG. 1.

The secondary aqueous coating composition of the present invention includes a first water soluble, emulsifiable or dispersible curable acrylic polymer(s) and a second water soluble, emulsifiable or dispersible curable acrylic polymer(s) different from the first acrylic polymer, the secondary aqueous coating composition being essentially free of a urethane-containing material.

The term "secondary coating" refers to a coating composition applied secondarily to one or a plurality of strand(s) after the sizing composition is applied. As used herein, the terms "size", "sized" or "sizing" refer to the aqueous composition applied to the fibers immediately after formation of the glass fibers.

As used herein, the term "water soluble" means that the first acrylic polymer and/or second acrylic polymer are capable of being essentially uniformly blended and/or molecularly or ionically dispersed in water to form a true solution. See *Hawley's Condensed Chemical Dictionary*, (12th Ed. 1993) at page 1075, which is hereby incorporated by reference.

The term "emulsifiable" as used herein means that the first acrylic polymer and/or second acrylic polymer are capable of forming an essentially stable mixture or being suspended in water in the presence of an emulsifying agent. See Hawley's at page 461, which is hereby incorporated by reference. Non-limiting examples of suitable emulsifying agents are set forth below.

The term "dispersible" means that the first acrylic polymer and/or second acrylic polymer are capable of being distributed throughout water as finely divided particles, such as a latex. See Hawley's at page 435, which is hereby incorporated by reference. The uniformity of the dispersion can be increased by the addition of wetting, dispersing or emulsifying agents (surfactants), which are discussed below.

As used herein, the term "curable" means (1) the first acrylic polymer and/or second acrylic polymer are capable of being at least partially dried by air and/or heat; and/or (2) the first acrylic polymer and/or second acrylic polymer, other components of the composition and/or glass fibers are capable of being crosslinked to each other to change the physical properties of the first acrylic polymer and/or second acrylic polymer. See Hawley's at page 331, which is hereby incorporated by reference.

The first curable acrylic polymer(s) are one or more homopolymers, copolymers or multipolymers and can be one or more addition polymerization products of one or more monomer components comprising one or more acrylic monomers, polymers and/or derivatives thereof (hereinafter "acrylic(s)"). The acrylic of the first curable acrylic polymer can also be addition polymerized with an addition polymerizable monomer or polymer, as discussed below.

Useful acrylics include acrylic acid, methacrylic acid, derivatives and mixtures thereof. See *Kirk-Othmer Encyclopedia of Chemical Technology*, Vol. 1 (1963) at page 285, which is hereby incorporated by reference. Other non-limiting examples of suitable acrylics include esters of acrylic acid and methacrylic acid, such as acrylates and methacrylates, including epoxy functional (meth)acrylates, acrylic anhydrides, acrylamides, acrylonitriles and derivatives and mixtures thereof. Useful acrylics can have hydroxy and/or epoxy functionality.

Useful esters of acrylic or methacrylic acid include straight chain or branched alkyl or hydroxyalkyl esters of acrylic or methacrylic acid. Useful alkyl esters can contain about 1 to about 24 carbon atoms, and preferably containing about 1 to about 18 carbon atoms. Non-limiting examples of alkyl esters include methyl (meth)acrylate, ethyl (meth) acrylates, propyl (meth)acrylates, butyl (meth)acrylates, pentyl (meth)acrylates, hexyl (meth)acrylates, heptyl (meth) acrylates, octyl (meth)acrylates, nonyl (meth)acrylates, decyl (meth)acrylates, dodecyl (meth)acrylates, tetradecyl (meth)acrylates, hexadecyl (meth)acrylates, ethylhexyl (meth)acrylates, lauryl (meth)acrylates, stearyl (meth) acrylates and 2-ethylhexyl (meth)acrylate. Suitable hydroxyalkyl esters include 2-hydroxyethyl (meth)acrylate, 2-hydroxypropyl (meth)acrylate, 3-hydroxypropyl (meth) acrylate and hydroxybutyl (meth)acrylate.

Non-limiting examples of other useful acrylics include glycol acrylates such as ethylene glycol diacrylate, propylene glycol diacrylate, 1,3-propanediol acrylate, 1,4-butanediol acrylate, 1,4-butanediol methacrylate, 1,6-hexanediol diacrylate, neopentyl glycol diacrylate, 1,3-butyleneglycol diacrylate and tetraethylene glycol diacrylate. A useful polyol acrylate is trimethylolpropane triacrylate.

Useful epoxy functional acrylates include polyglycidyl acrylates and polyglycidyl methacrylates.

Non-limiting examples of suitable acrylamides include methacrylamide, methylolacrylamide, and N-substituted derivatives thereof.

Non-limiting examples of suitable acrylonitriles include acrylonitrile and methacrylonitrile.

Non-limiting examples of addition polymerizable monomers which can be reacted with the acrylic include other vinyl monomers such as vinyl aromatics including styrene, vinyl toluene, alpha methyl styrene, halostyrenes such as chlorostyrene, and vinyl napthalene; dienes including butadienes such as 1,3-butadiene and 2,3-dimethyl-1,3-butadiene; isoprene; and chloroprene; vinyl halides such as vinyl chloride and vinylidene chloride, vinyl acetates, block and graft copolymers thereof. Other useful addition polymerizable monomers include amides, such as n-methylol (meth)acrylamide; nitriles; pyrrolidones and olefins such as ethylene. Mixtures of any of the above addition polymerizable monomers are also useful. Preformed polymers of these monomers can also be addition polymerized with the acrylic polymer provided the preformed polymer has addition polymerizable unsaturation.

Methods for polymerizing acrylics with themselves and/or other addition polymerizable monomers and preformed polymers are well known to those skilled in the art of polymers and further discussion thereof is not believed to be necessary in view of the present disclosure. For example, polymerization of the acrylic can be carried out in bulk, in aqueous or organic solvent solution such as benzene or n-hexane, in emulsion, or in aqueous dispersion. Kirk-Othmer, Vol. 1 at page 305. The polymerization can be effected by means of a suitable initiator system, including free radical initiators such as benzoyl peroxide or azobisisobutyronitrile, anionic initiation, and organometallic initiation. Molecular weight can be controlled by choice of solvent or polymerization medium, concentration of initiator or monomer, temperature, and the use of chain transfer agents. If additional information is needed, such polymerization methods are disclosed in Kirk-Othmer, Vol. 1 at pages 203–205, 259–297 and 305–307, which are hereby incorporated by reference.

The number average molecular weight (Mn), as determined by gel permeation chromatography of the acrylic polymer, can be about 200 to about 200,000 and is preferably about 30,000 to about 100,000. The glass transition temperature of the acrylic polymer can be about −40° C. to about 100° C., preferably about −30° C. to about 80° C., and more preferably about −25 to about +35 as measured using a Differential Scanning Calorimeter (DSC), for example a Perkin Elmer Series 7 Differential Scanning Calorimeter, using a temperature range of about −55° C. to about 150° C. and a scanning rate of about 20° C. per minute.

Useful acrylic latexes can be characterized by the temperature at which the torsional modulus of an air dried film is 300 kg/cm$^2$, referred to as T300, which is a relative measure of stiffness. A T300 of about +22° C. is considered soft while higher numbers indicate more stiff and/or tacky acrylics. The acrylics which can be used in the practice of this invention preferably have a T300 of about −50° C. to about +40° C., preferably about −35° C. to about +35° C.

Preferably, the first curable acrylic polymer is present in an emulsion including an emulsifying agent, suitable examples of which are discussed below. The first curable acrylic polymer is preferably self-crosslinking, although external crosslinking agents can be included in the secondary aqueous coating composition for crosslinking the first curable acrylic polymer with itself, the second curable acrylic polymer or other components of the secondary aqueous coating composition, as discussed below. The first curable acrylic polymer can be cationic, anionic or nonionic, but preferably is anionic or nonionic.

Non-limiting examples of useful acrylic polymers include Fulatex® materials which are commercially available from H. B. Fuller Co. of St. Paul, Minn. Useful FULATEX® materials including FULATEX® PN-3716G, which is believed to include about 42 weight percent butyl acrylate and about 58 weight percent styrene, and FULATEX® PN-3716L1 which is believed to include about 45 weight percent butyl acrylate, 53 weight percent styrene and less than about 1 weight percent butyl methyl acrylate. FULATEX® PN-3716L1 has a glass transition temperature of about +15° C., about 44 to about 46 weight percent solids, a pH of about 7.0 to about 8.5, a viscosity of about 50 to about 800 centipoise (measured using Brookfield Viscometer Model RVF at 20 revolutions per minute (rpm) at 25° C.). See PN-3716-L1 Technical Data Sheet of H. B. Fuller Co. (Jul. 25, 1994). Another useful acrylic polymer is FULATEX® PN-3716K, which has a glass transition temperature of about 26° C., about 44 to about 46 weight percent solids, a pH of about 2.0 to about 3.5, a viscosity of about 10 to about 200 centipoise (measured using Brookfield Viscometer Model RVF at 20 revolutions per minute (rpm) at 25° C.). See PN-3716-K Technical Data Sheet of H. B. Fuller Co. (Jul. 25, 1994), which is hereby incorporated by reference. Other useful FULATEX® materials include FULATEX® PN-3716F, FULATEX® PN-3716H and FULATEX® PN-3716J.

Other useful acrylic polymers include self-crosslinking acrylic emulsions such as the family of RHOPLEX® emulsions commercially available from the Rohm & Haas Company. See "Building Better Nonwovens", a Technical Bulletin of Rohm and Haas Specialty Industrial Polymers, (1994), which is hereby incorporated by reference.

An example of a useful acrylic polymer is RHOPLEX® TR-407 which is an anionic self-crosslinking emulsion and has a T300 of +30, is milky white in appearance, has 45.5 percent solids, a Brookfield LVF viscosity at 25° C. of 30 cps (No. 1 spindle, 60 RPM), a pH of 4.0, a glass transition temperature of about 34° C. and a density of 8.7 lb./gal. "Building Better Nonwovens" at page 7.

RHOPLEX® E-32 nonionic self-crosslinking acrylic emulsion has a pH of about 2.6, a density of about 8.8 lb./gallon at 25° C., a glass transition temperature of about 5° C. and a viscosity of 200 centipoise (measured on a Brookfield viscometer, #1 spindle at 12 revolutions per minute (rpm)) is also a suitable acrylic for use in the present invention. "Building Better Nonwovens" at page 7.

Other examples are RHOPLEX® HA-8, HA-12 and HA-16 self-crosslinking acrylic emulsions. RHOPLEX® HA-8 is nonionic, has a T300 of 14° C., is a milky-white liquid, has about 45.5 percent solids, a Brookfield LVF viscosity of about 550 cps (No. 3 spindle, 60 rpm), a pH of about 3.0, and a density of about 8.7 lb./gallon at 25° C. "Chemicals For The Textile Industry", page 2, a Technical Bulletin of Rohm and Haas Company (November 1977) and "RHOPLEX® HA-8, RHOPLEX® HA-12, RHOPLEX® HA-16", page 2, a Technical Bulletin of Rohm and Haas Company (January 1978), which are hereby incorporated by reference.

Another suitable acrylic latex is RHOPLEX® WL-81 acrylic latex, which is a thermoplastic acrylic polymer with approximately 40 percent solids, a Brookfield viscosity of 40 to 500 cps at 25° C. (No. 2 spindle, 30 rpm), a T300 of 60° C., a specific gravity of 1.036 and a pH of 7.5.

An additional example of a suitable acrylic latex is RHOPLEX® E-693 emulsion, which is a self-crosslinking acrylic polymer having a milky white liquid appearance with an anionic emulsifying system, a solids content of 50 percent, a pH of 5.5, a density at 25° C. of 8.8 lbs./gal, and a minimum film-forming temperature of 12° C., and a T300 of 24° C.

Also useful are the CARBOSET acrylic polymers which are commercially available from B. F. Goodrich Co. of Toledo, Ohio.

Useful acrylic polymers include copolymers of acrylic monomers with addition polymerizable monomers such as vinyl aromatics or vinyl compounds. Examples of such copolymers believed to be useful in the present invention are n-methylolacrylamide vinyl acetate copolymers and VINOL® vinyl acetate products which are commercially available from Air Products and Chemicals, Inc. of Allentown, Pa.

Another suitable acrylic latex is an acrylonitrile butadiene copolymer such as is commercially available from B. F. Goodrich Chemical Co. under the trade designation of HYCAR G-17.

Yet another suitable acrylic is a self-crosslinking ethylene acrylic acid copolymer. The ethylene acrylic acid (EAA) copolymers which are preferred in the present invention are dispersions of the copolymer having an number molecular weight as determined by GPC of about from 5,000 to 10,000. The polymer has a hardness (shore D) of from about 42 to 48, a vicat softening point of about 104° to 115° C., a melt index of from about 300 to 1300 g/10 min and a density of about 0.96 gm/cc at 25° C. EAA's hydrophobic character is believed to enhance water resistance in the "wet" applications such as filter felt for the paper industry and in brushes. EAA also has good adhesive characteristics which helps the impregnant adhere strongly to the surface of the fiber. Specific examples of useful EAA copolymer dispersions are MICHEM® PRIME 4990 or MICHEM® PRIME 4983HS available from Michelman Inc. of Cincinnati, Ohio. These aqueous EAA copolymer dispersions are white in color and have a total solids content of approximately 20 to 38 percent, although other concentrations would be effective also. These dispersions have a Brookfield viscosity of about 100 to 600, a surface tension of about 44 to 49 dynes/centimeter and weigh about 8.22 lbs./gal. The dispersible polymer in the two MICHEM® PRIME formulations are PRIMACOR® 5990 and 5980, respectively.

The amount of the first curable acrylic polymer(s) can be about 1 to about 99 weight percent of the secondary aqueous coating composition on a total solids basis, preferably about 5 to about 95 weight percent, and more preferably about 70 to about 90 weight percent. On an aqueous basis, the amount of first curable acrylic polymer can be about 0.1 to about 25 and, more preferably, about 2.5 to about 22 weight percent.

The second curable acrylic polymer can be any of the acrylics discussed above, however it must be different from the first acrylic polymer, for example it can be polymerized from one or more different acrylic components and/or different addition polymerizable monomer(s). For example, the first acrylic polymer can be MICHEM® PRIME 4990 and the second acrylic polymer can be HYCAR G-17. Alternatively, the first acrylic polymer can be RHOPLEX® E-32 or RHOPLEX® TR-407 and the second acrylic polymer can be FULATEX® PN-3716-J or PN-3716-L.

The amount of second curable acrylic polymer(s) is about 1 weight percent to about 99 weight percent of the secondary aqueous coating composition on a total solids basis, preferably about 5 to about 95 weight percent, and more preferably about 10 to about 30 weight percent. On an aqueous basis, the amount of second curable acrylic polymer can be about 0.05 to about 15 weight percent, and preferably about 1.2 to about 13.3 weight percent of the aqueous secondary coating composition.

The secondary aqueous coating composition is essentially free of a urethane-containing polymer. The phrase "essentially free of a urethane-containing polymer" as used herein means that the secondary aqueous coating composition contains less than two weight percent of a urethane-containing polymer on a total solids basis, preferably less than about one weight percent, and most preferably the secondary coating composition is free of a urethane-containing polymer.

The phrase "urethane-containing polymer" as used herein means any polymer containing one or more units of the structure (I):

See Kirk-Othmer, Vol. 21 at pages 56–69, which are hereby incorporated by reference. As noted in Kirk-Othmer, Vol. 21 at page 57, the terms urethane and polyurethane are commonly used to refer to urethan and polyurethan, respectively. As used herein, the terms "urethane" and "polyurethane" are used to refer to "urethan" and "polyurethan", respectively. Such urethane-containing materials can be elastomeric, thermoplastic or thermosetting, and either water soluble, or emulsifiable or dispersible with the use of an emulsifying or dispersing agent.

Urethane-containing polymers are typically condensation products of a polyisocyanate material and a hydroxyl-containing material such as polyether polyol or polyester polyol and include, for example, WITCOBOND® W-290H thermoplastic polyurethane which is commercially available from Witco Chemical Corp. of Chicago, Ill. Other examples of commercially available polyurethanes include other members of the WITCOBOND® family of polyurethanes such as WITCOBOND® W-212 and W-234. The WITCOBOND® W-212 material has a milky-white appearance with a 30 percent solids level and a density of 8.7 lb./gallon. The flash point is greater than 100° C., the particle charge is cationic and the particle size is about 1 micron. The pH at 25° C. (77° F.) is 4.5, the viscosity at 25° C. in Brookfield LVF is 50 centipoise, and the surface tension is dynes/cm is 41. Witcobond® W-234 aliphatic polyurethane is hazy in appearance, has 30 percent solids and a density of 8.8 lb./gal. The flash point is similar to the W-212 material and the particle charge is anionic. The pH at 25° C. is 8.0, the viscosity at 25° C. as measured by Brookfield LVF is 100 centipoise, and the surface tension in dynes/cm is 54.

Other examples of thermosetting polyurethanes include BAYBOND XW-110, which is commercially available from Bayer and other thermosetting polyurethanes which are commercially available from Bayer and E. I. duPont de Nemours Co. of Wilmington, Del. Other polyurethanes include thermoplastic urethane elastomers, such as RUCOTHANE® 2011L polyurethane latex, which have a solids content of 55 to 65 weight percent and are commercially available from Ruco Polymer Corp. of Hicksville, N.Y. Their pH is generally around 10 with average particle sizes ranging from about 0.8 to about 2.5 microns.

Further examples of polyurethane include those that are internally emulsified, examples of which may be found in U.S. Pat. Nos. 4,143,091; 4,208,494 and 4,208,495, each of which is hereby incorporated by reference. Other types of polyurethane polymers are those having ionic groups present on the polymer molecule such as those disclosed in U.S Pat. No. 4,066,591.

Other examples of polyurethane polymers include polyurethane ionomers having ionic groups such as anionomers and cationomers. Examples of such ionomers include anionomers that are produced by reacting organic diisocyanates having molecular weights of from about 160 to about 300 with alkylene polyols such as ethylene glycol, and optionally other aliphatic glycols having molecular weights of from about 62 to about 200 in the presence of glycols containing carboxyl, carboxylate, sulfonic acid and/or sulfonate groups and having a number average molecular weight of less than around 500. These polyurethane polymers containing the ionic groups of hydrophilic polyether segments are self-emulsifiable. Other polyurethanes include cationic polyurethanes that are formed by quaternizing polyaddition reactions. Such polyurethanes are not only self-dispersing but typically have average particle sizes of less than about 5 microns.

The secondary aqueous coating composition can include a crosslinking agent for crosslinking the first curable acrylic polymer and the second curable acrylic polymer. Non-limiting examples of suitable crosslinkers which can be used when the first acrylic polymer or second acrylic polymer is thermosetting are aminoplast and phenoplast resins which are well known to those skilled in the polymer art. For example, the CYMEL® family of melamine resins from American Cyanamid Company are useful crosslinking agents.

Other useful crosslinking agents include blocked isocyanates such as BAYBOND XW 116 or XP 7055, epoxy crosslinkers such as WITCOBOND XW by Witco Corp., and polyesters such as BAYBOND XP-7044 or 7056. The BAYBOND products are commercially available from Bayer of Pittsburgh, Pa. Generally, the amount of crosslinker can be about 1 to about 10 weight percent of the secondary aqueous coating composition on a total solids basis, preferably about 4 to about 6 weight percent, and more preferably about 5 to about 6 weight percent.

The aqueous secondary coating composition can include a fiber lubricant. Useful lubricants include cationic, nonionic or anionic lubricants and mixtures thereof. Generally, the amount of lubricant can be about 1 to about 15 weight percent of the secondary aqueous coating composition on a total solids basis, preferably about 3 to about 12 weight percent, and more preferably about 5 to about 10 weight percent.

Non-limiting examples of such lubricants are glass fiber lubricants which include amine salts of fatty acids (which can, for example, include a fatty acid moiety having 12 to 22 carbon atoms and/or tertiary amines having alkyl groups of 1 to 22 atoms attached to the nitrogen atom ), alkyl imidazoline derivatives (such as can be formed by the reaction of fatty acids with polyalkylene polyamines), acid solubilized fatty acid amides (for example, saturated or unsaturated fatty acid amides having acid groups of 4 to 24 carbon atoms such as stearic amide), acid solubilized polyunsaturated fatty acid amides, condensates of a fatty acid and polyethylene imine and amide substituted polyethylene imines, such as EMERY® 6717, a partially amidated polyethylene imine commercially available from Henkel Corporation of Kankakee, Ill.

A useful alkyl imidazoline derivative is CATION X, which is commercially available from Rhone Poulenc of Princeton, N.J. Other useful lubricants include RD-1135B epoxidized polyester which is To commercially available from Borden Chemical of Louisville, Ky., CIRRASOL 185A fatty acid amide, KETJENLUBE 522 partially carboxylated polyester which is commercially available from Akzo Chemicals, Inc. Of Chicago, Ill. and Protolube HD high density polyethylene emulsion which is commercially available from Sybron Chemicals of Birmingham, N.J.

The secondary aqueous coating composition can include emulsifying agents for emulsifying the first acrylic polymer and/or second acrylic polymer. Non-limiting examples of suitable emulsifying agents or surfactants include polyoxyalkylene block copolymers, ethoxylated alkyl phenols, polyoxyethylene octylphenyl glycol ethers, ethylene oxide derivatives of sorbitol esters and polyoxyethylated vegetable oils.

An example of a suitable polyoxypropylene-polyoxyethylene copolymer is the material PLURONIC™ F-108, which is commercially available from BASF Corporation of Parsippany, N.J. This material is a condensate of ethylene oxide with hydrophobic bases formed by condensation of propylene oxide with propylene glycol.

Examples of useful ethoxylated alkyl phenols include ethoxylated octylphenoxyethanol, phenoxy polyethyleneoxy(ethanol), phenoxy(ethyleneoxy)ethanol and nonyl phenoxy poly(ethyleneoxy)ethanol. An example of a commercially available ethoxylated octylphenoxyethanol is IGEPAL CA-630 from GAF Corporation of Wayne, N.J.

An example of a polyoxyethylated vegetable oil is EMULPHOR EL-719, which is commercially available from GAF Corp. A useful polyoxyethylene octylphenyl glycol ether is TRITON X-100, which is commercially available from Rohm & Haas of Philadelphia, Pa. TWEEN 21 and 81 are examples of useful ethylene oxide derivatives of sorbitol esters.

Generally, the amount of emulsifying agent can be about 0.5 to about 10 weight percent of the secondary aqueous coating composition on a total solids basis, and is preferably about 0.5 to about 5 weight percent.

The secondary aqueous coating composition can include one or more aqueous soluble, emulsifiable or dispersible wax materials. The wax material can be selected from vegetable, animal, mineral, synthetic or petroleum waxes, for example. Preferably, the wax has a high degree of crystallinity and is obtained from a paraffinic source, such as a microcrystalline wax. The microcrystalline wax can be oxidized. Suitable commercially available waxes are, for example, MICHEM® LUBE 296 microcrystalline wax, POLYMEKON® SPP-W microcrystalline wax and PETROLITE 75 microcrystalline wax. These waxes, which are paraffinic hydrocarbon dispersions, are available from Michelman Inc. of Cincinnati, Ohio and the Petrolite Corporation of Tulsa, Okla., respectively. Generally, the amount of wax can be about 1 to about 10 weight percent of the secondary aqueous coating composition on a total solids basis, and preferably about 3 to about 5 weight percent. On an aqueous basis, the amount of wax material generally can be about 0.25 to about 5 weight percent and, more preferably, about 0.5 to about 4.3 weight percent.

Flame retardant, such as antimony trioxides and halogenated phosphates, and antistatic agent can also be included in the secondary aqueous coating composition. The amount of flame retardant or antistatic agent can be about 1 to about 3 weight percent of the secondary aqueous coating composition on a total solids basis.

A dye can be included in the secondary aqueous coating composition to provide a colored strand product. Non-limiting examples of useful colorants or pigments include carbon black, nigrosine, and cadmium-based compounds, iron oxide-based compounds and chromium compounds. Other useful colorants or pigments include AQUA BLACK which is commercially available from B. F. Goodrich and ULTRAMARINE BLUE which is commercially available from Whittaker Chemical. Generally, the amount of dye on an aqueous basis can be about 1 to about 5 weight percent, and more preferably about 1 to about 3 weight percent. Users of the treated strand may find dyed strand useful for various applications where color coding is important.

The secondary aqueous coating composition can also include one or more aqueous dispersible or soluble plasticizers. Examples of suitable non-aqueous-based plasticizers which are aqueous dispersible plasticizers include phthalates, such as di-n-butyl phthalate; trimellitates, such as trioctyl trimellitate; and adipates, such as dioctyl adipate. An example of an aqueous soluble plasticizer is CARBOWAX 400, a polyethylene glycol which is commercially available from Union Carbide of Danbury, Conn. The amount of plasticizer can be about 5 to about 15 weight percent of the secondary aqueous coating composition on a total solids basis, and is more preferably about 5 to about 10 weight percent.

Water (preferably deionized) is included in the secondary aqueous coating composition in an amount sufficient to facilitate application of a generally uniform coating upon the strand. The weight percentage of solids of the secondary aqueous coating composition generally can be about 15 to about 50 weight percent. Preferably, the weight percentage of solids is about 20 to about 35 weight percent and, more preferably, about 25 to about 35 weight percent. Although not preferred, it should be understood that minor amounts of water miscible or water soluble organic solvents can be included in the secondary aqueous coating composition, so long as the essential characteristics of the coating composition are not adversely affected.

The secondary aqueous coating composition of the present invention can be prepared by any suitable method well known to those of skilled in the art. Preferably, the first curable acrylic polymer is formed by addition polymerization of the monomer component. Similarly, the second curable acrylic polymer is formed by addition polymerization of the monomer component. Each of the first curable acrylic polymer and the second curable acrylic polymer is preferably diluted with deionized water before mixing with the other components.

The first and second acrylic polymers can be mixed and/or reacted with any other components of the secondary aqueous coating composition, such as emulsifiers, dye, wax and/or water. Preferably each of the components is diluted with water prior to addition to the mixture. If necessary, the plasticizer or lubricant can be pre-emulsified prior to addition to the mixture. The components of the composition are then mixed to form a generally homogenous mixture prior to application to the strand. While the composition is being applied to the strand, it is preferred that the composition be agitated for 1 minute out of every 10 minutes of recirculating when being recirculated through a holding tank.

Before application of the secondary coating composition, the glass fibers are treated with a sizing composition or fiber protectant to reduce interfilament abrasion. The secondary aqueous coating composition of the present invention can be applied to any type of fiberizable glass composition known to those skilled in the art. Glass fibers suitable for use in the present invention include those prepared from fiberizable glass compositions such as "E-glass", "621-glass", "A-glass", "C-glass", "D-glass", "S-glass", "ECR-glass" (corrosion resistant glass) and fluorine and/or boron-free derivatives thereof. Such compositions are well known to those skilled in the art and are disclosed in Loewenstein at pages 29 and 33–45, which is hereby incorporated by reference.

The secondary coating composition of the present invention is applicable to high modulus, low elongation (a modulus of elongation of at least $7 \times 10^6$ psi and an elongation at break of at most 5 percent) fibers or filaments, preferably sized glass fibers.

Such sizing compositions can include as components film-formers such as thermoplastic or thermosetting polymeric film-formers in a variety of forms including emulsions, dispersions, latexes thereof and mixtures thereof, such as liquid polyoxyalkylene polyols or polyalkylene polyols (polypropylene/polyethylene copolymer); lubricants such as animal, vegetable or mineral oils or waxes or cationic lubricants such alkyl imidazoline derivatives and polyethyleneimine polyamides; coupling agents, including silane coupling agents such as gamma-aminopropyltrimethoxysilane, gamma-methacryloxypropyltrimethoxysilane and gamma-glycidoxypropyltrimethoxysilane; emulsifiers; antioxidants; antifoaming agents; colorants; antistatic agents; bactericides and water, to name a few, though preferably starch is not included.

Examples of suitable sizing compositions are set forth in K. Loewenstein, *The Manufacturing Technology of Continuous Glass Fibres* at pages 243–295 (2d Ed. 1983) and U.S. Pat. Nos. 4,390,647 and 4,795,678, each of which is hereby incorporated by reference.

The sizing can be applied in many ways; such as by contacting the strand with a roller or belt applicator, spraying, or other means. Non-limiting examples of such applicators and other suitable applicators are disclosed in Loewenstein at pages 169–177, which is hereby incorporated by reference.

The sized fibers can be dried at room temperature or at elevated temperatures. Suitable ovens for drying glass fibers are well known to those of ordinary skill in the art. Drying of glass fiber forming packages or cakes is discussed in detail in Loewenstein at pages 224–230, which is hereby incorporated by reference. For example, the forming package can be dried in an oven at a temperature of about 104° C. (220° F.) to about 149° C. (300° F.) for about 10 to about 13 hours to produce glass fiber strands having a dried residue of the curable composition thereon. The temperature and time for drying the glass fibers will depend upon such variables as the percentage of solids in the sizing composition, components of the sizing composition and type of glass fiber. The sizing is present on the fibers in an amount between about 0.5 percent and 5 percent by weight after drying. After drying, the sized glass fibers are typically gathered together into bundles or strands of generally parallel fibers and further treated with the secondary aqueous coating composition of the present invention.

The secondary aqueous coating composition of the present invention is applied to at least a portion of the sized glass fibers of the strand in an amount effective to coat or impregnate the portion of the sized glass fibers of the strand. The secondary aqueous coating composition can be applied by dipping the strand in a bath containing the composition, by spraying the composition upon the strand or by contacting the strand with an applicator such as a roller or belt applicator, for example. The coated strand can be passed through a die to remove excess coating composition from the strand. The method and apparatus for applying the secondary aqueous coating composition to the strand is determined in part by the configuration of the strand material.

Preferably, the process of applying the secondary aqueous coating composition includes passing the strands through a bath or dip of the secondary aqueous coating composition and preferably includes exposing the fibers to elevated temperatures for a time sufficient to at least partially dry or cure the secondary aqueous coating composition. The strand can be "opened up" just before entering the secondary treating composition bath by passing it over a bar or other spreading device which acts to separate the individual fibers from one another. This spreading of the fibers from one another results in a more thorough impregnation of the strand with the composition.

The amount of the secondary aqueous coating composition on the strand is defined as the dip pick-up (DPU). The DPU is calculated using the weight of the glass strand before and after the secondary aqueous coating composition is applied. The DPU is defined as the coated strand weight minus the uncoated strand weight, then divided by the uncoated strand weight. Multiplying the resultant figure by 100 results in percent DPU. The DPU of the impregnated bundles or strands of the instant invention is about 5 to about 20 weight percent for a single pass through the impregnant bath and drying step. The strands may ultimately have an amount of coating greater than about 30 weight percent by passing them through the impregnating bath a number of times or by overcoating the coated bundle of fibers or strands with the secondary coating composition. Preferably, the strand having the dried residue of the secondary aqueous coating composition thereon typically has a dip pick-up (DPU) of between about 5 to about 30 weight percent, and preferably about 8 to about 15 weight percent.

The strand is preferably dried after application of the secondary aqueous coating composition in a manner well known in the art. The impregnated strand is at least partially dried in air at room temperature (about 25° C.) or alternatively in a furnace or oven preferably above 232° C. (450° F.) to speed the curing process and evaporate the water. A particularly suitable drier is that disclosed in U.S. Pat. No. 5,197,202, which is hereby incorporated by reference.

After the sizing and secondary coating composition have been applied to the glass strand and each layer has been dried, additional coatings, such as a tertiary coating composition, can be applied to at least a portion of the strand. In one embodiment, the tertiary coating composition includes one or more acrylic polymer(s) such as are discussed above, which is different from one of the acrylic polymers of the secondary coating composition. Preferably, the tertiary coating composition includes an ethylene acrylic acid copolymer, such as MICHEM® PRIME 4983HS aqueous ethylene acrylic acid copolymer emulsion. MICHEM® PRIME 4983HS has about 35 weight percent solids.

Preferably the acrylic polymer comprises about 0.5 to about 5 weight percent of the tertiary coating composition, and more preferably about 1 weight percent. The tertiary coating composition can also include an antistatic agent such as is discussed above.

The tertiary coating composition generally includes about 5 to about 40 weight percent solids, and preferably about 10 to about 25 weight percent. The tertiary coating composition can be applied in a manner similar to that of the secondary coating composition discussed above.

The tertiary coating composition can be dried in air, a furnace or oven, as discussed above, although it is preferred to dry the coating in air. The strand having the dried residue of the tertiary coating composition thereon can have a dip pick-up (DPU) of between about 5 to about 30 weight percent, and preferably about 8 to about 15 weight percent.

The glass fiber strands can be further processed by twisting into a yarn, chopping, combination in parallel to form a bundle or roving, weaving into a cloth or forming into a chopped or continuous strand mat, as discussed above.

The present invention also includes an optical fiber cable assembly 10, such as is shown in FIG. 1, comprising: (a) one or more optical fibers 12; and (b) a reinforcement strand 14 positioned about at least a portion of the periphery 13 of the optical fiber 12 for reinforcing the optical fiber cable assembly 10.

Useful optical fibers are formed from extremely pure silica glass. Suitable optical fibers are well known to those of ordinary skill in the art and are commercially available from AT&T or Corning Glass Works of Corning, N.Y. Such fibers typically have diameters of about 125 microns and lengths of about 2 kilometers to about 20 kilometers.

In typical optical fiber cables 10, the optical fibers 12 are positioned about a generally stiff member 16, which can be an epoxy/glass pultruded rod or steel rod, for example. The member 16 provides stability to the cable to inhibit contraction and expansion of the assembly 10 due to environmental temperature change.

The reinforcement strand 14, which inhibits tension and compressive forces on the optical fibers 12, comprises a plurality of sized glass fibers 18 having on a surface 20 thereof a dried residue of the secondary aqueous coating composition 22 discussed above. In an alternative embodiment, the secondary aqueous coating composition consists essentially of: (a) a water soluble, emulsifiable or dispersible curable acrylic polymer; and (b) a wax material, the secondary aqueous coating composition being essentially free of a urethane-containing polymer. Each of these components is discussed above. The optical fiber cable assembly 10 can also include a protective layer 24 positioned about at least a portion of a periphery of the optical fiber 12 and reinforcement strand 14. Typically, the protective layer 24 comprises a thermoplastic material extruded as a jacket over the other components of the assembly 10. Suitable thermoplastic materials include polyethylene and polyvinyl chloride. The protective layer 24 protects the assembly 10 from damage from the environment.

The present invention will now be illustrated by the following specific, non-limiting examples.

EXAMPLE 1

The aqueous sizing composition of Table 1 and aqueous secondary coating composition of Table 2 were applied to glass fiber strands, as discussed below, which were evaluated for compression fatigue resistance at a temperature of about −40° C. and loss on ignition (LOI) after the coated strands were aged in hot water (about 80° C.).

TABLE 1

| Component | Weight Percent of Component |
| --- | --- |
| PLURACOL V-10 polyoxyalkylene polyol[1] | 78 |
| EMERY 6717 partially amidated polyethylene imine lubricant[2] | 8 |
| A-1108 aminosilane[3] | 14 |

[1]PLURACOL V-10 polyoxyalkylene polyol is commercially available from BASF Wyandotte of Michigan.
[2]EMERY 6717 partially amidated polyethylene imine lubricant is commercially available from Henkel Corporation of Kankakee, Illinois.
[3]A-1108 aminosilane is commercially available from OSi Specialties, Inc. of Danbury, Connecticut.

TABLE 2

| Component | Weight of Component (grams) |
| --- | --- |
| RHOPLEX ® E-32 acrylic polymer[4] | 10775 |
| POLYMEKON S-PPW wax[5] | 375 |
| Deionized water | 5000 |

[4]RHOPLEX ® E-32 acrylic polymer having about 46 weight percent solids is commercially available from Rohm and Haas Company of Philadelphia, Pennsylvania.
[5]POLYMEKON ® SPP-W microcrystalline wax having about 40 weight percent solids is commercially available from Michelman Inc. of Cincinnati, Ohio The weight percent solids of the secondary aqueous sizing composition of Table 2 was adjusted with deionized water to about 32 weight percent. The secondary coating composition was coated onto a 4 strand bundle of H-15 E-glass fibers (1600 filaments per strand) having thereon the dried residue of the aqueous sizing composition and wound to form a forming package. The weight of sizing composition on the fibers after drying the forming package at a temperature of about 100° C. for about 10 hours was about 0.7 weight percent.

The secondary aqueous coating composition was applied to the sized glass fibers by drawing the glass fibers through a bath of the coating and a die to remove excess coating, such that the DPU of the coated glass strand was about 11 to about 12 percent. The diameter of the passage through the die for the 4 strand samples prepared was about 1.1 millimeters (0.044 inches).

Two five yard skein specimens of strand coated with the aqueous secondary coating composition of Table 2 were evaluated for loss on ignition (LOI), which is the weight loss of coating on the glass strand after heating at about 650° C. (about 1200° F.).

Each specimen was weighed at a temperature of about 23° C. +/−2° C. (73.4° F. +/−3.6° F.) at a relative humidity of about 55% +/−5%. The specimens were heated in a conventional muffle furnace to a temperature of about 650° C. (about 1200° F.) for about 30 minutes, cooled to room temperature and reweighed.

It has been observed that glass fiber strand sized with the sizing composition of Table 1 and coated with the aqueous secondary coating composition of Table 2, exhibited good compression fatigue resistance at a temperature of about −40° C. after aging in hot water at about 80° C.

The loss on ignition for that glass fiber strand sized with the sizing composition of Table 1 and coated with the aqueous secondary coating composition of Table 2 before and after 15 weeks of hot water aging at about 80° C. was compared to that of two comparative examples which include polyurethane in their respective secondary coating compositions.

Each comparative example had applied thereon the sizing composition of Table 1. The secondary coating composition applied to the first comparative example included about 68 weight percent WITCOBOND® W-290H thermoplastic polyurethane; about 10 weight percent BAYBOND XW-110; about 4 weight percent WITCO XW epoxy crosslinker; about 12 weight percent POLYMEKON S-PPW-40 wax emulsion; about 12 weight percent Santicizer 160 plasticizer; and about 1 weight percent TWEEN 21 emulsifier. The secondary coating composition applied to the second comparative example included about 55 weight percent WITCOBONDO® W-290H thermoplastic polyurethane; about 12 weight percent BAYBOND XW-110; about 4 weight percent WITCO XW epoxy crosslinker; about 3 weight percent POLYMEKON S-PPW-40 wax emulsion; about 2 weight percent TWEEN 21 emulsifier; and about 24 weight percent PX-111 alkyl trimellitate plasticizer.

The loss on ignition for the sample according to the present invention (Sample A), the first comparative example and second comparative example before and after hot water aging for 15 weeks at about 80° C. are set forth in Table 3 below.

aging at a temperature of about 80° C. for about 6 months only resulted in a 0.5 weight percent reduction in LOI. Prior to hot water aging, the loss on ignition was about 11.5 weight percent. After 6 months aging in water at 80° C., the loss on ignition was about 11 weight percent.

It is believed that low variation in loss on ignition after prolonged hot water aging, such as observed for this example of the present invention, is indicative of good compression fatigue resistance.

EXAMPLE 2

The components in the amounts set forth in Table 3 were mixed to form secondary aqueous coating compositions according to the present invention.

TABLE 3

| Component | Weight of Component (grams) for Sample | | | | | | |
|---|---|---|---|---|---|---|---|
| | 1 | 2 | 3 | 4 | 5 | 6 | 7 |
| RHOPLEX ® E-32 acrylic polymer[1] | 10775 | 6000 | 15085 | — | — | — | — |
| RHOPLEX ® T-32 acrylic polymer[2] | — | — | — | — | — | — | 10775 |
| RHOPLEX ® TR-407 acrylic polymer[3] | — | 6000 | — | — | — | — | — |
| FULATEX ® PN-3716J[4] | — | — | — | 10775 | — | — | — |
| FULATEX ® PN-3716K[5] | — | — | — | — | — | 10775 | — |
| FULATEX ® PN-3716L1[6] | — | — | — | — | 10775 | — | — |
| POLYMEKON S-PPW wax[7] | 375 | 500 | 765 | 375 | 375 | 375 | 375 |
| Deionized water | 6000 | 6000 | 6000 | 6000 | 6000 | 6000 | 6000 |

[1]RHOPLEX ® E-32 acrylic polymer is commercially available from Rohm and Haas Company.
[2]RHOPLEX ® T-32 acrylic polymer is commercially available from Rohm and Haas Company.
[3]RHOPLEX ® TR-407 acrylic polymer having about 45.5 percent solids is commercially available from Rohm and Haas.
[4]FULATEX ® PN-3716J acrylic multipolymer having about 44 to about 46 weight percent solids is commercially available from H. B. Fuller Co. of St. Paul, Minnesota.
[5]FULATEX ® PN-3716K acrylic multipolymer having about 44 to about 46 weight percent solids is commercially available from H. B. Fuller Co.
[6]FULATEX ® PN-3716L1 acrylic multipolymer having about 44 to about 46 weight percent solids weight percent solids is commercially available from H. B. Fuller Co. Fulatex ® PN-3716L1 is believed to include about 45 weight percent butyl acrylate, 53 weight percent styrene and less than about 1 weight percent butyl methyl acrylate.
[7]POLYMEKON ® SPP-W microcrystalline wax having about 40 weight percent solids is commercially available from Michelman Inc. of Cincinnati, Ohio.

TABLE 3

| | Loss on Ignition in weight percent | | |
|---|---|---|---|
| | Sample | Comparative Example 1 | Comparative Example 2 |
| before hot water aging | 11.5 | 11.8 | 11.5 |
| after 15 weeks aging in hot water at 80° C. | 11.3 | 3.2 | 3.85 |

As shown in Table 3, glass strand coated with a secondary coating composition of the present invention inhibits hot water (80° C.) aging and degradation in loss on ignition about three times better than the secondary coating compositions of the Comparative Examples which included polyurethane.

Similarly, the loss on ignition of glass strand coated with the secondary coating composition of Table 1 after hot water A first comparative example was prepared using a secondary coating composition which included about 85 weight percent WITCOBOND 290-H polyurethane, about 5 weight percent WITCO XW epoxy crosslinker, about 1 weight percent TWEEN 21 emulsifier, about 6 weight percent PX-336 alkyl trimellitate plasticizer, and about 3 weight percent PROTOLUBE HDA polyethylene emulsion. A second comparative example was prepared using a secondary coating composition which included about 70 weight percent WITCOBOND® W-290H thermoplastic polyurethane; about 6 weight percent BAYBOND XW-110; about 4 weight percent WITCO XW epoxy crosslinker; about 3 weight percent POLYMEKON S-PPW-40 wax emulsion; about 2 weight percent TWEEN 21 emulsifier; and about 15 weight percent PX-336 alkyl trimellitate plasticizer. While the Comparative Examples included polyurethane, they did not include an acrylic polymer.

The secondary coating compositions were coated onto 4 and 5 strand bundles of H-15E-glass fibers (1600 filaments per strand) having thereon the dried residue of an aqueous sizing composition and wound to form forming packages. The aqueous sizing composition was prepared according to U.S. Pat. No. 4,390,647, and included about 78 weight percent PLURACOL V-10 polyoxyalkylene polyol, about 8 weight percent EMERY 6717 partially amidated polyethylene imine and about 14 weight percent A-1108 aminosilane. The weight of sizing composition on the fibers after drying the forming packages at a temperature of about 100° C. for about 10 hours was about 0.7 weight percent.

The secondary aqueous coating compositions were applied to the sized glass fibers by drawing the glass fibers through a bath of the coating and a die to remove excess coating, such that the LOI of the coated glass strand was about 11 to about 12 percent. The diameter of the passage through the die for the 4 strand samples prepared was about 1.1 millimeters (0.044 inches) and for the 5 strand samples was about 1.22 millimeters (0.048 inches).

Five specimens each of strand coated with the aqueous secondary coating compositions of Samples 1–7 were conditioned at about 24° C. +/−2° C. (75° F. +/−5° F.) at about 55% +/−5% relative humidity for at least two hours and evaluated for tensile breaking strength (pounds-force or $lb_f$) using a drum clamp test fixture on an Instron Model No. 1125 testing machine. The chart speed was 25.4 millimeters/minute (1 inch/minute), the crosshead speed was 304.8 millimeters/minute (12 inches/minute) and the load was 453.6 kilograms (1000 lbs.).

To determine the tensile stiffness and composite tensile modulus of each specimen, three 10 yard skein specimens of strands coated with the aqueous secondary coating compositions of each of Samples 1–7 were conditioned under similar conditions to those set forth above for tensile breaking strength testing. Each specimen was weighed and measured for specific gravity using a Fisher-Young gravitometer Model No. 2-148. Each specimen was evaluated for tensile stiffness and composite tensile modulus using pneumatic grips on an Instron Model No. 1125 testing machine. The Instron machine was set to Range 2 (Strain Data Unit) (which provides a magnification ratio of 1000), the crosshead speed was 5.1 millimeters/minute (0.2 inches/minute) and the full scale chart load was 45.4 kilograms (kg) (100 lbs.) or 22.7 kg (50 lbs.) load on the specimen.

The relative resistance to bending was evaluated for five test specimens each of strand coated with the aqueous secondary coating compositions of Samples 1–7 using a MIT Folding Endurance Tester Model #2, which is commercially available from Tinius Olsen Testing Machine Co. of Willow Grove, Pa. Each test specimen was 15.24 centimeters (6 inches) in length. Each specimen was conditioned at about 23° C. +/−2° C. (73.4° F. +/−3.6° F.) for at least 2 hours prior to testing. A 1.52 mm (0.06 inch) jaw, 2 lb. load and spring No. 4 were used to evaluate the number of cycles to failure. See also ASTM Standard D-2176.

Two five yard skein specimens of strands coated with the aqueous secondary coating compositions of each of Samples 1–7 were evaluated for percentage of outgassing at 200° C. or 250° C. and loss on ignition (LOI), which is the weight loss of coating on the glass strand after heating at about 650° C. (about 1200° F.).

Each specimen was weighed at a temperature of about 23° C. +/−2° C. (73.4° F. +/−3.6° F.) at a relative humidity of about 55% +/−5%. Each specimen was heated in a conventional forced air oven to a temperature of about 200° C. or 250° C., as specified, for about 30 minutes. After cooling to room temperature (about 23° C. +/−2° C.), each skein was reweighed. The specimens were heated in a conventional muffle furnace to a temperature of about 650° C. (about 1200° F.) for about 30 minutes, cooled to room temperature and reweighed.

The average adhesion of strand coated with the aqueous secondary coating compositions of Samples 1–7 in high density polyethylene or polyvinyl chloride was determined according to ASTM D1871-68, which was modified as follows. Seven specimens of each sample were prepared, each specimen being about 30.48 centimeters (12 inches) to about 76.2 centimeters (30 inches) in length.

Fourteen specimens were prepared for testing at a time by the following method. The platens of the press were preheated to about 182° C. (360° F.). A 10.16 centimeter (4 inch) by 25.4 centimeter (10 inch) sheet of Mylar® polyester film, which is commercially available from E. I. du Pont de Nemours et Cie & Company of Wilmington, Del., was placed in the mold cavity of the bottom plate of a heated press. The strand cavity in the bottom plate was placed on the Mylar® film with a 1 inch insert. About 40 grams of solid thermoplastic molding stock (high density polyethylene or polyvinyl chloride) was placed generally uniformly in the mold cavity. The polyvinyl chloride (757C) and high density polyethylene are both available from AT&T.

A knot was tied in each test specimen, which was placed in the cavity with the knot positioned outside of the cavity. Strand tension weights were attached to the end of each test specimen to align each strand straight in the mold. Fourteen specimens were accommodated in each molding. An additional 40 grams of stock was placed over the strands for a total of about 80 +/−0.5 grams of stock per molding. A sheet of Mylar® film was placed over the stock, and the top plate placed upon the mold.

The mold was placed in the press at a clamp pressure of less than about 1 ton until the platen temperature returned to about 182° C. (360° F.). When the platen temperature reached about 182° C. (360° F.), the pressure upon the mold was increased to about 10 tons for about 5 minutes. The platen heaters were turned off and cooling water turned on for about five minutes, then the molding was removed from the press.

The Mylar® film was stripped from the samples and the strand and flashing on the knot side of the molding were cut flush with the molding edge. The flashing from the other side of the molding was also removed. Each sample was tested for the force necessary to pull the strands linearly out of the molding stock according to ASTM D-1871-68.

The results of the evaluations for average tensile breaking strength, average tensile stiffness, average composite tensile modulus, average cycles to failure (MIT folding test), percent outgassing, loss on ignition (LOI) and adhesion to polyvinyl chloride or high density polyethylene for strands coated with the aqueous secondary coating compositions of Samples 1–7 (corresponding to Run Nos. 1–7, respectively) and the Comparative Example are set forth in Table 4.

Table 4 shows that samples prepared according to the present invention, which do not include a urethane-containing material, exhibit generally higher tensile strength than the Comparative Example which includes about 86 weight percent polyurethane. It is believed that the slightly lower tensile strength value for sample 3B is attributable to the sample being taken from a turn around point in the package formation, as explained in Footnote 14. The samples prepared according to the present invention generally have values of tensile stiffness and modulus, percent outgassing at 250° C. and loss on ignition comparable to that of the Comparative Examples, yet are free of the expensive polyurethane ingredient.

EXAMPLE 3

Glass fiber strand, which was sized and coated with the secondary coating of Sample 1 according to Example 2, was overcoated with an aqueous tertiary coating composition consisting of about 25 weight percent solids MICHEM Prime 4983HS ethylene acrylic acid copolymer in deionized

TABLE 4

| TEST | Run No. | | | | | | | | | | | | | Comp. Ex. 1 | Comp. Ex. 2 |
|---|---|---|---|---|---|---|---|---|---|---|---|---|---|---|---|
| | $1A^1$ | $1B^2$ | $1C^3$ | $2A^4$ | $2B^5$ | $3A^6$ | $3B^7$ | $4A^8$ | $4B^9$ | $5A^{10}$ | $5B^{11}$ | $6A^{12}$ | $6B^{13}$ | | |
| Average Tensile Strength ($lb_f$) | 232 | 272 | 329 | 229 | 322 | 229 | $217^{14}$ | 261 | 280 | 248 | 303 | 230 | 323 | 226 | 180 |
| Percent $COV^{15}$ of Tensile Strength | 2.29 | 4.69 | 4.37 | 15.5 | 5.19 | 14.90 | 33.70 | 9.71 | 14.70 | 9.57 | 2.75 | 16.40 | 5.26 | 2.18 | 5.59 |
| Average Tensile Stiffness ($lb_f$/percent elongation) | 72.3 | 79.0 | 101.0 | 78.6 | 97.7 | 74.6 | 96.2 | 77.6 | 94.4 | 78.5 | 104.0 | 78.6 | 96.0 | 73.0 | 72.9 |
| Average Tensile Modulus ($lb_f$/inch$^2$ × 10$^6$) | 5.80 | 6.25 | 6.92 | 6.82 | 7.06 | 5.76 | 6.53 | 4.18 | 4.09 | 6.23 | 7.28 | 5.36 | 4.67 | 6.06 | 5.69 |
| Percent COV of Tensile Modulus | 2.64 | 4.400 | 5.330 | 0.859 | 0.727 | 2.810 | 8.100 | 4.360 | 5.810 | 5.060 | 4.000 | 7.560 | 5.040 | 0.33 | 3.05 |

| TEST | Run No. | | | | | | | | | | | | | Comp. Ex. 1 | Comp. Ex. 2 |
|---|---|---|---|---|---|---|---|---|---|---|---|---|---|---|---|
| | 1A | 1B | 1C | 2A | 2B | 3A | 3B | 4A | 4B | 5A | 5B | 6A | 6B | | |
| Average MIT Folding Flexibility (cycles to failure) | 8849 | 2237 | 1704 | 1626 | 1272 | 20603 | 7370 | 438 | 369 | 631 | 398 | 103 | 110 | 38967 | 52894 |
| Percent COV of MIT Folding Flexibility | 47.8 | 39.6 | 16.8 | 24.4 | 24.2 | 59.6 | 50.4 | 15.0 | 26.0 | 25.4 | 16.6 | 32.4 | 43.8 | 31.6 | 54.9 |
| Average Percent Outgassing at 200° C. | 1.150 | 0.814 | 0.834 | 0.509 | 0.556 | 1.140 | 1.020 | 0.350 | 0.361 | 0.418 | 0.381 | 0.580 | 0.500 | 0.254 | 0.279 |
| Average Percent Outgassing at 250° C. | 1.55 | 1.46 | 1.32 | 1.10 | 0.937 | 1.67 | 1.44 | 0.951 | 0.944 | 1.36 | 1.33 | 1.16 | 1.04 | 1.18 | 1.52 |
| Average Loss on Ignition (%) | 12.7 | 11.9 | 10.8 | 10.6 | 9.49 | 14.70 | 12.00 | 10.70 | 11.00 | 11.60 | 10.60 | 12.30 | 11.20 | 11.4 | 12.3 |
| Average Adhesion to high density polyethylene ($lb_f$) | 7.25 | — | — | — | — | — | — | — | — | — | — | — | — | 8.36 | 4.82 |
| Percent COV of Adhesion to high density polyethylene | 13.2 | — | — | — | — | — | — | — | — | — | — | — | — | 19.9 | 18.9 |
| Average Adhesion to polyvinyl chloride ($lb_f$) | 33 | 23.6 | 28.0 | 24.6 | 27.40 | 26.80 | 31.50 | 23.30 | 22.80 | 8.68 | 10.80 | 12.60 | 13.40 | 74 | 93 |
| Percent COV of Adhesion to polyvinyl chloride | 29.3 | 24.4 | 18.6 | 24.5 | 26.3 | 28.0 | 32.6 | 18.8 | 33.6 | 55.0 | 21.0 | 38.0 | 24.5 | 7.8 | 13.8 |

[1] Four strand bundle.
[2] Four strand bundle.
[3] Five strand bundle.
[4] Four strand bundle.
[5] Five strand bundle.
[6] Four strand bundle.
[7] Five strand bundle.
[8] Four strand bundle.
[9] Five strand bundle.
[10] Four strand bundle.
[11] Five strand bundle.
[12] Four strand bundle.
[13] Five strand bundle.
[14] It was observed during testing that the tensile breaks for this sample appeared to occur at the point on the bundle which came from a turnaround point on the package. The cord appeared flattened at these points, which was believed to be due to excessive pressure applied during winding of the package.
[15] Coefficient of Variation.

water to yield a dries residue upon the strand of about 1 weight percent as an overcoat. The Control was not overcoated.

The results of testing conducted similarly to Example 2 above for average tensile breaking strength, average tensile stiffness, average composite tensile modulus, percent outgassing, loss on ignition (LOI) and adhesion to polyvinyl chloride are set forth in Table 5. Also included in Table 5 are results from tensile strength testing of samples soaked in (1) 1 normal aqueous solution of hydrochloric acid at about 24° C. (75° F.) for about 3 hours; or (2) 1 molar aqueous solution of sodium hydroxide at about 24° C. (75° F.) for about two minutes. Each sample was rinsed in water for about two minutes and dried at 120° C. (250° F.) for about 5–10 minutes.

TABLE 5

| TEST | Control[1] | Overcoated Sample[2] |
|---|---|---|
| Average Tensile Strength (lb$_f$) | 178.0 | 157.0 |
| Percent COV[3] of Tensile Strength | 4.61 | 7.91 |
| Average Tensile Strength (lb$_f$) after Hydrochloric Acid Soak | 156.0 | 181.0 |
| Percent COV of Tensile Strength after Hydrochloric Acid Soak | 4.83 | 5.64 |
| Percent Retention after Hydrochloric Acid Soak | 87.6 | >100 |
| Average Tensile Strength (lb$_f$) after Sodium Hydroxide Soak | 125.0 | 168.0 |
| Percent COV of Tensile Strength after Sodium Hydroxide Soak | 7.37 | 4.40 |
| Percent Retention after Sodium Hydroxide Soak | 70.2 | >100 |
| Average Tensile Stiffness (lb$_f$/percent elongation) | 91.6 | 90.8 |
| Average Tensile Modulus (lb$_f$/inch$^2$ × 10$^6$) | 6.64 | 6.44 |
| Percent COV of Tensile Modulus | 2.22 | 9.67 |
| Average Percent Outgassing at 200° C. | 0.523 | 0.416 |
| Average Percent Outgassing at 250° C. | 1.10 | 0.994 |
| Average Loss on Ignition (%) | 10.1 | 10.1 |
| Average Adhesion to high density polyethylene (lb$_f$) | 8.92 | 18.30 |
| Percent COV of Adhesion to high density polyethylene | 32.2 | 14.4 |

[1]Four strand bundle, direct draw.
[2]Four strand product, direct draw.
[3]Coefficient of Variation.

As shown in Table 5, the ethylene-acrylic acid overcoat has greater tensile strength after soaking in hydrochloric acid or sodium hydroxide, less outgassing, and greater adhesion to high density polyethylene when compared to the Control which does not include the overcoat.

EXAMPLE 4

The components in the amounts set forth in Table 6 were mixed to form a secondary aqueous coating composition and coat a glass fiber strand according to the present invention in the following manner.

TABLE 6

| COMPONENT | Weight of Component in Composition (grams) | Weight Percent Solids of Component in Composition | Weight Percent of Component in Composition (Aqueous Basis) |
|---|---|---|---|
| MICHEM ® Prime 4990 ethylene acrylic acid copolymer[1] | 24 | 5.1 | 1.3 |
| HYCAR G-17 acrylonitrile butadiene copolymer[2] | 200 | 61.1 | 15.5 |
| WITCO XW epoxy crosslinker[3] | 94 | 28.7 | 7.3 |
| POLYMEKON ® SPP-W microcrystalline wax[4] | 21 | 5.1 | 1.3 |
| Deionized Water | 303 | — | 74.6 |

[1]MICHEM ® PRIME 4990 ethylene acrylic acid copolymer having about 35 weight percent solids is commercially available from Michelman Inc.
[2]HYCAR G-17 acrylonitrile butadiene copolymer having about 50 weight percent solids is commercially available from B. F. Goodrich Chemical Co.
[3]WITCO XW epoxy crosslinker having about 50 weight percent solids is commercially available from Witco Chemical Corp. of Chicago, Illinois.
[4]POLYMEKON ® SPP-W microcrystalline wax is commercially available from Michelman Inc.

The secondary aqueous coating composition was coated onto four strand bundles of glass fiber (1600 filaments per strand) which had thereon the dried residue of an aqueous sizing composition comprised of about 78 percent polypropylene/polyethylene copolymer, 8 percent polyethyleneimine polyamide, and 14 percent of aminosilane. The weight of sizing composition on the fibers after drying at a temperature of about 100° C. for about 10 hours was about 0.7 weight percent.

The secondary aqueous coating composition was applied to the strand by spreading apart the individual fibers of the strand just before entering the coating composition bath, dipping the spread fibers into the coating [co]mposition, and at least partially drying them in an oven at about 280° C. for less than about a minute. The fibers with the dried secondary coating composition thereon had excellent hydrolytic stability, good adhesion to several polymers and were flexible yet stiff enough to be used in the manufacture of brushes and filters. The LOI was about 11 percent and the flex resistance as measured by the MIT flex folding test was several thousand cycles.

The strand coated with the dried residue of the coating composition of Table 6 generally had good flexibility and strength for reinforcing fiber optic cable.

Glass fiber strand coated with the secondary coating composition of the present invention has good compression fatigue and hot water aging resistance. Also, glass fiber strand coated with the secondary aqueous coating composition of the present invention can have excellent hydrolytic stability, good corrosion resistant properties, good adhesion to several polymers such as styrene-butadiene-rubber (SBR), polyvinyl chloride (PVC), polyurethanes and other polymers and be flexible yet stiff enough to be used in a wide variety of applications such as reinforcement for optical fiber cables; reinforcement for rubber and/or elastomeric articles like belts and hoses; brushes; filters; and geotextile applications.

The tertiary coating compositions of the present invention can provide good tensile strength after soaking in hydrochloric acid or sodium hydroxide, outgassing, and adhesion to high density polyethylene.

From the foregoing description, it can be seen that the present invention comprises secondary aqueous coating compositions for coating glass fibers which provide less expensive coatings for glass fibers and are compatible with a range of polymers. Such coated glass fibers can be used in a number of applications in which relative stiffness, flexural strength, tensile strength, acid and caustic resistance, abrasion resistance, outgassing and compressive strength are needed.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, I claim:

1. A strand comprising a plurality of sized glass fibers having thereon a secondary aqueous coating composition, the secondary aqueous coating composition comprising:

(a) a first water soluble, emulsifiable or dispersible curable acrylic polymer; and (b) a second water soluble, emulsifiable or dispersible curable acrylic polymer different from the first acrylic polymer, the secondary aqueous coating composition being essentially free of a urethane-containing polymer.

2. The strand of claim 1, wherein a tertiary coating composition comprising an ethylene-acrylic acid copolymer is applied to the surface after the secondary aqueous coating composition is at least partially dried.

3. The strand according to claim 1, wherein the first acrylic polymer is prepared by vinyl addition polymerization of a monomer component comprising an acrylic monomer.

4. The strand according to claim 3, wherein the acrylic monomer of the monomer component is selected from the group consisting of acrylic acid, methacrylic acid, alkyl esters of acrylic acid, alkyl esters of methacrylic acid, acrylic anhydrides, acrylamides, acrylonitriles and derivatives and mixtures thereof.

\* \* \* \* \*

UNITED STATES PATENT AND TRADEMARK OFFICE
CERTIFICATE OF CORRECTION

PATENT NO. : 5,827,612
DATED : October 27, 1998
INVENTOR(S) : Mikhail M. Girgis

It is certified that error appears in the above-identified patent and that said Letters Patent is hereby corrected as shown below:

Title page,
U.S. Application Data, lines 2-3 please correct "continuation-in-part of Ser. No. 900,036, Jun. 17, 1992, Pat. No. 5,369,141" to -- continuation-in-part of Ser. No. 900,034, Jun. 17, 1992, abandoned --

Column 1,
Lines 12-13, please correct "application of Ser. No. 900,036, Jun. 17, 1992, Pat. No. 5,369,141" to -- application of Ser. No. 900,034, Jun. 17, 1992, now abandoned --

References Cited, under U.S. PATENT DOCUMENTS, please correct the listing of references by adding the following documents:

| | | | | | |
|---|---|---|---|---|---|
| -- | 4,948,829 | 08/1990 | Mitsuji, et al | 524 | 457 |
| | 4,954,559 | 09/1990 | Den Hartog, et al. | 524 | 507 |
| | 5,182,784 | 01/1993 | Hager, et al. | 385 | 128 -- |

FOREIGN PATENT DOCUMENTS, please correct the listing of references by adding the following documents:

| | Document No. | Date | Country |
|---|---|---|---|
| -- | 0 356 655 | 03/1990 | Europe |
| | 93-004349 | 01/1993 | Japan (ABSTRACT) |
| | 2340389 | 10/1977 | France (ABSTRACT) -- |

UNITED STATES PATENT AND TRADEMARK OFFICE
CERTIFICATE OF CORRECTION

PATENT NO. : 5,827,612
DATED : October 27, 1998
INVENTOR(S) : Mikhail M. Girgis

It is certified that error appears in the above-identified patent and that said Letters Patent is hereby corrected as shown below:

OTHER PUBLICATIONS, please correct the listing of references by adding the following documents,
"Rhoplex Acrylic Emulsions for Bonding and Finishing Dry-Laid Nonwoven Fabrics", Technical Bulletin of Rohm and Haas Co.
"Rhoplex E-32", Product Bulletin of Rohm and Haas Co.
K. Loewenstein, The Manufacturing Technology of Continuous Glass Fibres, (2d Ed. 1983) at pages 169-177, 244-230, 243-295.
Kirk-Othmer Encyclopedia of Chemical Technology, Vol. 1 (1963) at pages 203-205, 259-297, 305-307; Vol. 21 at pages 56-69.
PN-3716-L1 Technical Data Sheet of H. B. Fuller Co. (July 25, 1994).
PN-3716-K Technical Data Sheet of H. B. Fuller Co. (July 25, 1994).

Signed and Sealed this

Sixteenth Day of April, 2002

*Attest:*

*Attesting Officer*

JAMES E. ROGAN
*Director of the United States Patent and Trademark Office*